(12) United States Patent
Hu

(10) Patent No.: US 12,721,710 B2
(45) Date of Patent: Sep. 1, 2026

(54) TOOTHBRUSH HEAD

(71) Applicant: Hanbao Hu, Gaozhou City (CN)

(72) Inventor: Hanbao Hu, Gaozhou City (CN)

( * ) Notice: Subject to any disclaimer, the term of this patent is extended or adjusted under 35 U.S.C. 154(b) by 421 days.

(21) Appl. No.: 18/483,271

(22) Filed: Oct. 9, 2023

(65) Prior Publication Data

US 2025/0114179 A1 Apr. 10, 2025

(51) Int. Cl.
*A61C 17/22* (2006.01)
*A61C 17/34* (2006.01)

(52) U.S. Cl.
CPC .......... *A61C 17/222* (2013.01); *A61C 17/225* (2013.01); *A61C 17/3436* (2013.01)

(58) Field of Classification Search
CPC ... A46B 5/0095; A61C 17/222; A61C 17/225; A61C 17/3436; A61C 17/34; A61C 17/3481
See application file for complete search history.

(56) References Cited

U.S. PATENT DOCUMENTS 7,934,284 B2 5/2011 Braun et al.
11,071,612 B1 7/2021 Zhou
11,071,613 B1 7/2021 Zhou
11,173,021 B2 * 11/2021 Papazian .................. A46B 9/04
11,229,507 B1 1/2022 Zhou
11,553,999 B2 * 1/2023 Scherrer ............ A61C 17/3436
2021/0322141 A1 10/2021 He et al.
2022/0133457 A1 5/2022 Zhou
2024/0164512 A1 * 5/2024 Deilami .................. A46B 7/04

FOREIGN PATENT DOCUMENTS

CN 215273535 U * 12/2021 ............ A61C 17/34
CN 218922846 U * 4/2023 ............ A61C 17/22
CN 117100411 A * 11/2023 ............ A61C 17/22
CN 117100441 A * 11/2023 ............ A61C 17/22
DE 102011013086 A1 * 12/2012 ............... A46B 7/04

* cited by examiner

*Primary Examiner* — Laura C Guidotti

(57) ABSTRACT

A toothbrush head, including a toothbrush round head, a large body, and an eccentric inner shaft. The toothbrush round head is provided with bristles on one side and a first connecting structure on the other side. The large body is provided with a mounting groove. The mounting groove is provided therein with a mounting base. The mounting base is provided with a second connecting structure that cooperates with the first connecting structure. The sleeve head is provided with a rotating hole corresponding to a shape of the rotating shaft, the rotating shaft is provided therein with a magnetic attraction iron post. With the magnetic attraction force between the two magnetic attraction members and the magnetic attraction force on the magnetic attraction iron post, so that the connection between the toothbrush round head and the mounting base is tighter and more stable.

14 Claims, 8 Drawing Sheets

TOOTHBRUSH HEAD

TECHNICAL FIELD

The present invention relates to the technical field of a toothbrush, and in particular, to a toothbrush head.

BACKGROUND

An electric toothbrush causes a brush head to rotate or vibrate at a high frequency through the rapid rotation or vibration of an electric motor core to clean an oral cavity. A rotating-type electric toothbrush in the prior art is prone to generating vibration and noise when a toothbrush round head is rotated, which affects a user's experience.

SUMMARY

A main objective of the present invention is to provide a toothbrush head, which is intended to solve the problem that a toothbrush round head of a rotating-type electric toothbrush in the prior art is prone to generating vibration and noise during rotation.

To achieve the forgoing objective, the present invention proposes a toothbrush head, including:

- a toothbrush round head, which is provided with bristles on one side and a first connecting structure on the other side, the toothbrush round head being provided with a first transmission groove on the side wall;
- a large body, which is provided with a mounting groove, the mounting groove being provided with a mounting base for mounting the toothbrush round head, the mounting base being provided with a second connecting structure that cooperates with the first connecting structure, and the mounting base being rotatably connected to the toothbrush round head; and
- an eccentric inner shaft, which is provided within the large body, the eccentric inner shaft being movably connected to the large body, the eccentric inner shaft being provided with a transmission structure that cooperates with the first transmission groove.

One of the first connecting structure and the second connecting structure is a rotating shaft, and the other is a sleeve head. The sleeve head is provided with a rotating hole corresponding to the shape of the rotating shaft. The rotating shaft is provided therein with a magnetic attraction iron post. The sleeve head is provided therein with two magnetic attraction members attracting to each other. The two magnetic attraction members are located on the opposite sides of the magnetic attraction iron post.

Optionally, the first connecting structure is the sleeve head. The second connecting structure is the rotating shaft.

Optionally, the eccentric inner shaft is provided with a first limiting post at one side.

The side wall of the mounting base is provided with a limiting hole that cooperates with the first limiting post.

Optionally, the side wall of the mounting groove is provided with a second limiting post.

The side wall of the toothbrush round head is provided with a groove that cooperates with the second limiting post.

Optionally, the mounting groove is provided with a buckle structure at the side wall;

The side wall of the toothbrush round head is provided with a first rotating groove that is fastened with the buckle structure.

Optionally, the buckle structure is provided in a beveled position on a side facing an opening of the mounting groove.

Optionally, the eccentric inner shaft is provided with a second rotating groove at one side.

The side wall of the large body is provided with a limiting block that cooperates with the second rotating groove.

Optionally, the large body is provided with a plurality of limiting strips at the side wall. The limiting strips are configured to limit the eccentric inner shaft.

Optionally, the large body is provided with a tail cover at one end. The tail cover is provided with a bendable bending sheet at the side wall. The bending sheet is provided thereon with a catching block.

The side wall of the large body is opened and provided with a catching hole that is clamped and combined with the catching block.

Optionally, the side wall of the large body is provided with a slide groove in which the catching block is slid. The slide groove is configured to guide the catching block to the catching hole.

Optionally, the width of the catching block decreases progressively from the end away from the toothbrush round head to the end close to the toothbrush round head.

Optionally, the side wall of the tail cover is opened and provided with a strip groove. The strip groove runs through the tail cover towards one end of the tail cover;

The side wall of the large body is provided with a strip block that cooperates with the strip groove.

Optionally, the tail cover is provided with a splicing structure. The splicing structure is configured to be spliced with a grip of an electric toothbrush.

Optionally, one end of the eccentric inner shaft is provided with a second transmission groove. The second transmission groove is configured to be connected to a drive mechanism of the electric toothbrush.

Compared with the prior art, the present invention has the following beneficial effects: Two magnetic attraction members attracting to each other are provided within the sleeve head. The two magnetic attraction members are located on the opposite sides of the magnetic attraction iron post. With the magnetic attraction force between the two magnetic attraction members and the magnetic attraction force of the two magnetic attraction members on the magnetic attraction iron post, a slit between the toothbrush round head and the mounting base may be reduced, so that the connection between the toothbrush round head and the mounting base is tighter and more stable. Therefore, the vibration and noise generated by the toothbrush round head in a rotating process may be avoided effectively.

Compared with the prior art, the present invention has the following beneficial effects: Two magnetic suction members attracting to each other are provided within the sleeve head. The two magnetic suction members are located on the opposite sides of the magnetic suction iron post. With the magnetic suction force between the two magnetic suction members and the magnetic suction force of the two magnetic suction members on the magnetic suction iron post, a slit between the toothbrush round head and the mounting base may be reduced, so that the connection between the toothbrush round head and the mounting base is tighter and more stable. Therefore, the vibration and noise generated by the toothbrush round head in a rotating process may be avoided effectively.

BRIEF DESCRIPTION OF THE DRAWINGS

In order to explain embodiments of the present invention or the technical solutions in the prior art more clearly, the following briefly introduces the drawings that need to be used in the embodiments or the prior art. Obviously, the drawings in the following description are only some of embodiments of the present invention. Those skilled in the art may obtain other drawings based on structures shown in these drawings without creative labor.

REFERENCE NUMERALS ARE DESCRIBED AS FOLLOWS

Figure 1:
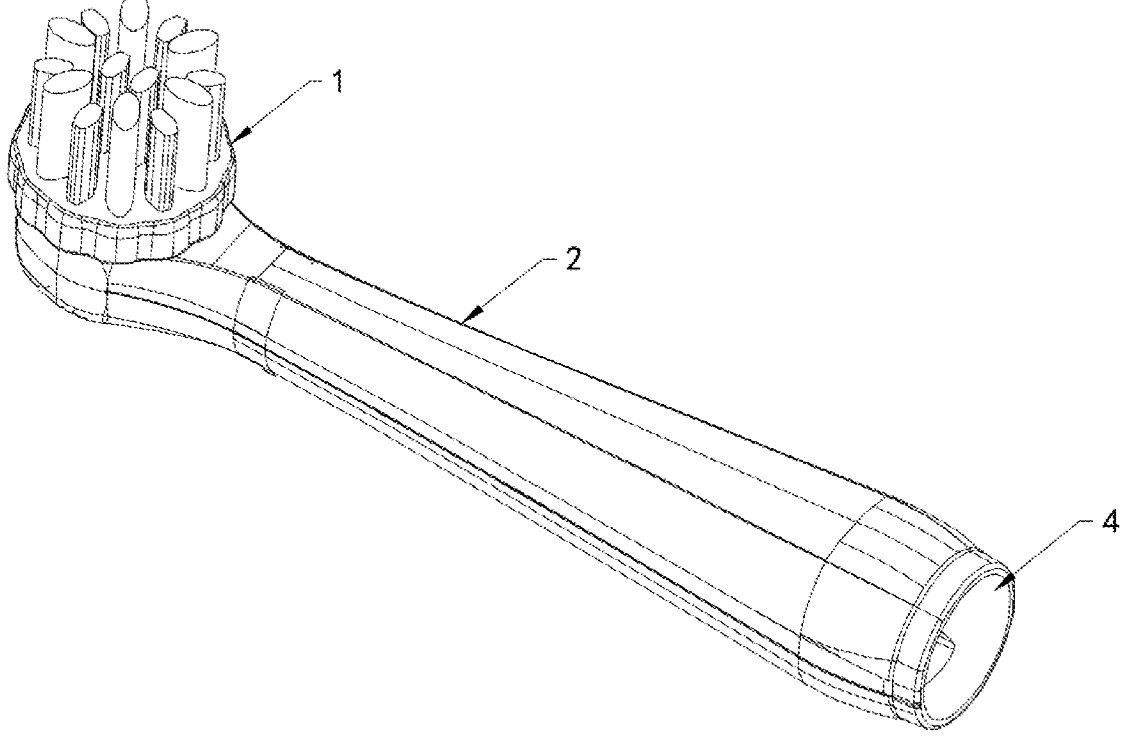
FIG. 1 shows a 3D schematic diagram of the present invention.

1, toothbrush round head; 2, large body; 3, eccentric inner shaft; 4, tail cover; 101, bristles; 102, sleeve head; 103, rotating hole; 104, magnetic attraction member; 105, first transmission groove; 106, groove; 107, first rotating groove; 201, mounting groove; 202, mounting base; 203, rotating shaft; 204, magnetic attraction iron post; 205, second limiting post; 206, buckle structure; 207, limiting block; 208, limiting strip; 209, catching hole; 210, slide groove; 211, strip block; 212, limiting hole; 301, transmission structure; 302, first limiting post; 303, second rotating groove; 304, second transmission groove; 401, bending sheet; 402, catching block; 403, strip groove.

The realization, functional features, and advantages of the present invention will be described further with reference to the accompanying drawings.

DETAILED DESCRIPTION OF EMBODIMENTS

The following clearly and completely describes the technical solutions in embodiments of the present invention in conjunction with the drawings in the embodiments of the present invention. Obviously, the described embodiments are only a part of the embodiments of the present invention, rather than all embodiments. Based on the embodiments of the present invention, all other embodiments obtained by a person skilled in the art without creative labor shall fall within the protection scope of the present invention.

It should be noted that if the embodiments of the present invention involve directional indications (such as up, down, left, right, front, back . . . ), the directional indications are only used to explain a relative position relationship and movement among various components under a certain posture (as shown in the accompanying drawings). If the specific posture changes, the directional indication also changes accordingly.

In addition, if there are descriptions of terms such as "first", "second" and the like in the embodiments of the present invention, the descriptions of the terms such as "first", "second" and the like are merely intended for a purpose of description, and shall not be understood as an indication or implication of relative importance or implicit indication of a quantity of indicated technical features. Therefore, the features defined with "first" and "second" can explicitly or implicitly include at least one of the features. In addition, the meaning of "and/or" in the whole text is to include three parallel schemes. Taking "A and/or B" as an example, "A and/or B" includes scheme A, scheme B, or a scheme that A and B are satisfied at the same time. In addition, the technical solutions between the various embodiments can be combined with each other, but should be based on what can be achieved by those skilled in the art. When a combination of technical solutions is contradictory or cannot be achieved, it should be considered that such a combination of technical solutions does not exist, and also does not fall within the scope of protection required by the present invention.

The present invention provides a toothbrush head. FIGS. 1 to 8 show specific embodiments of the toothbrush head provided by the present invention.

Referring to FIGS. 1 to 6, the toothbrush head includes:

a toothbrush round head 1, which is provided with bristles 101 on one side and a first connecting structure on the other side, the toothbrush round head 1 being provided with a first transmission groove 105 on the side wall;

a large body 2, which is provided with a mounting groove 201, the mounting groove 201 being provided with a mounting base 202 for mounting the toothbrush round head 1, the mounting base 202 being provided with a second connecting structure that cooperates with the first connecting structure, and the mounting base 202 being 1 rotatably connected to the toothbrush round head 1; and an eccentric inner shaft 3, which is provided within the large body 2, the eccentric inner shaft 3 being movably connected to the large body 2, the eccentric inner shaft 3 being provided with a transmission structure 301 that cooperates with the first transmission groove 105.

One of the first connecting structure and the second connecting structure is a rotating shaft 203, and the other is a sleeve head 102. The sleeve head 102 is provided with a rotating hole 103 corresponding to the shape of the rotating shaft 203. The rotating shaft 203 is provided therein with a magnetic attraction iron post 204. The sleeve head 102 is provided therein with two magnetic attraction members 104 attracting to each other. The two magnetic attraction members 104 are located on the opposite sides of the magnetic attraction iron post 204.

The large body 2 extends in the same direction as the eccentric inner shaft 3. The eccentric inner shaft 3 may be rotated back and forth relative to the large body 2. For ease of description, hereinafter taking as an example the extension direction of the eccentric inner shaft 3 being a left-right direction, the eccentric inner shaft 3 extends in the left-right direction to the inner part of the mounting groove 201. The transmission structure 301 is deviated from the axis of the eccentric inner shaft 3 and is a cylinder-shaped structure. The first transmission groove 105 is adapted in shape to the transmission structure 301 so that the transmission structure 301 pushes the toothbrush round head 1 to rotate back and forth through the first transmission groove 105 when the eccentric inner shaft 3 is oscillated back and forth.

Two magnetic attraction members 104 attracting to each other are provided within the sleeve head. The two magnetic attraction members 104 are located on the opposite sides of the magnetic attraction iron post 204. With the magnetic attraction force between the two magnetic attraction members 104 and the magnetic attraction force of the two magnetic attraction members 104 on the magnetic attraction iron post 204, a slit between the toothbrush round head 1 and the mounting base 202 may be reduced, so that the connection between the toothbrush round head 1 and the mounting base 202 is tighter and more stable. Therefore, the vibration and noise generated by the toothbrush round head 1 in a rotating process may be avoided effectively.

Optionally, the first connecting structure is the rotating shaft 203. The second connecting structure is the sleeve head 102. The magnetic attraction member 104 is a bar magnet. The N pole of one bar magnet faces the magnetic attraction iron post 204, and the S pole of the other bar magnet faces the magnetic attraction iron post 204.

Referring to FIGS. 2 to 6, one end of the eccentric inner shaft 3 is provided with a second transmission groove 304. The second transmission groove 304 is configured to be connected to a driving mechanism of an electric toothbrush. The driving mechanism is provided with a driving handle. When a grip of the electric toothbrush is spliced with the tail cover 4, the driving handle happens to extend into the second transmission groove 304 and is driven with the second transmission groove 304. The driving mechanism drives the eccentric inner shaft 3 to reciprocate through the driving handle and the second transmission groove 304.

The eccentric inner shaft 3 is provided with a first limiting post 302 at one side. The side wall of the mounting base 202 is provided with a limiting hole 212 cooperating with the first limiting post 302. The eccentric inner shaft 3 can be limited by the cooperation between the first limiting post 302 and the limiting hole 212, so as to avoid the vibration and noise generated when the eccentric inner shaft 3 rotates in a reciprocal direction within the large body 2.

The eccentric inner shaft 3 is provided with a second rotating groove 303 at one side. The side wall of the large body 2 is provided with a limiting block 207 which cooperates with the second rotating groove 303. The eccentric inner shaft 3 can be limited along a transverse direction through the cooperation of the second rotating groove 303 and the limiting block 207. The limiting effect of the first limiting post 302 and the limiting hole 212 is combined to further reduce the vibration of the eccentric inner shaft 3. The second rotating groove 303 runs through in a forward and backward direction so that the limiting block 207 does not interfere with the eccentric inner shaft 3 when the eccentric inner shaft 3 is rotated.

The large body 2 is provided with a plurality of limiting strips 208 at the side wall. The limit strips 208 are configured to limit the eccentric inner shaft 3. To further ensure that the eccentric inner shaft 3 does not vibrate during reciprocal rotation, the plurality of limiting strips 208 are provided herein. The plurality of limiting strips 208 extend in a left-right direction and are arranged in two rows. The middle of the two rows of the limiting strips 208 forms a limiting region of the eccentric inner shaft 3. The eccentric inner shaft 3 may be limited by the limiting region in the forward and backward direction, so as to reduce the vibration and noise generated when the eccentric inner shaft 3 rotates in a reciprocal direction.

The mounting groove 201 is provided with a buckle structure 206 on the side wall. The side wall of the toothbrush round head 1 is provided with a first rotating groove 107 that is fastened with the buckle structure 206. The toothbrush round head 1 is detachably provided with the large body 2. The toothbrush round head 1 can be fixed in the mounting groove 201 by fastening the buckle structure 206 with the first rotating groove 107. The first rotating groove 107 extends in a circumferential direction at the side wall of the toothbrush round head 1 so that the first rotating groove 107 does not interfere with the toothbrush round head 1 when the toothbrush round head 1 is oscillated back and forth.

The buckle structure 206 is provided in a beveled surface towards an opening of the mounting groove 201. For ease of description, hereinafter taking as an example the opening of the mounting groove 201 facing upwards, the beveled surface is provided obliquely from top to bottom towards the inner side of the mounting groove 201. The buckle structure 206 may be bent in an up-down direction. The beveled surface is provided so that when the toothbrush round head 1 is mounted, the toothbrush round head 1 may easily bend the buckle structure 206 and fasten the buckle structure 206 with the first rotating groove 107.

Figure 2:
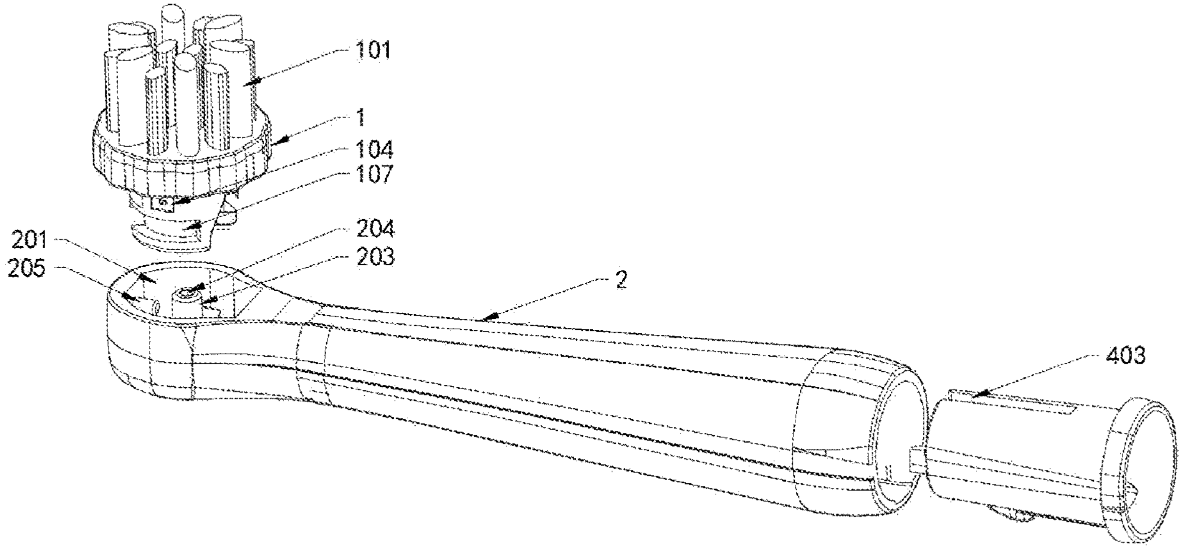
FIG. 2 shows an exploded view of the present invention.
Figure 3:
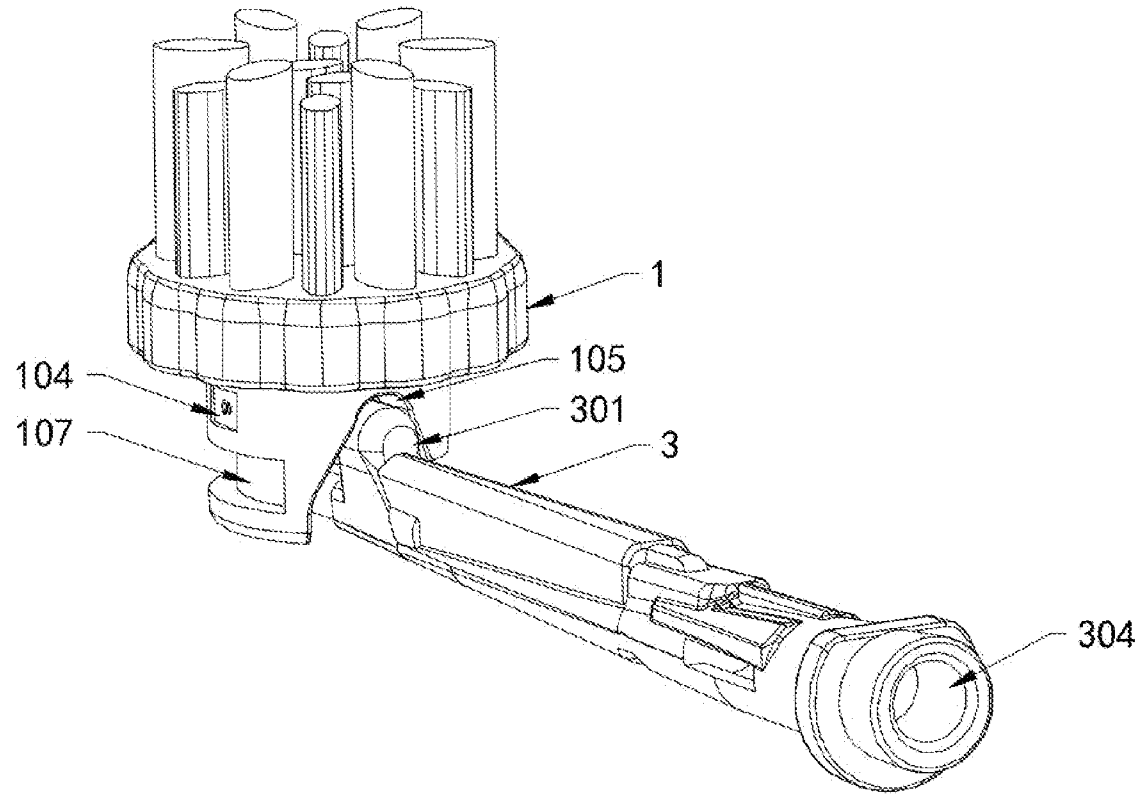
FIG. 3 shows a 3D schematic diagram of a toothbrush round head and an eccentric inner shaft of the present invention.
Figure 4:
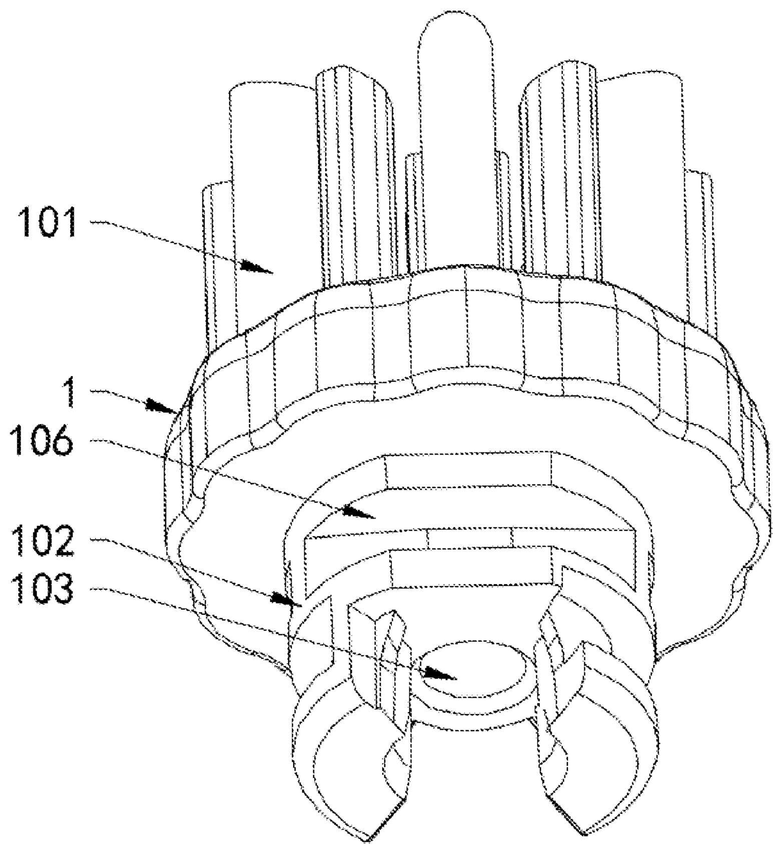
FIG. 4 shows a 3D schematic diagram of a toothbrush round head of the present invention.
Figure 5:
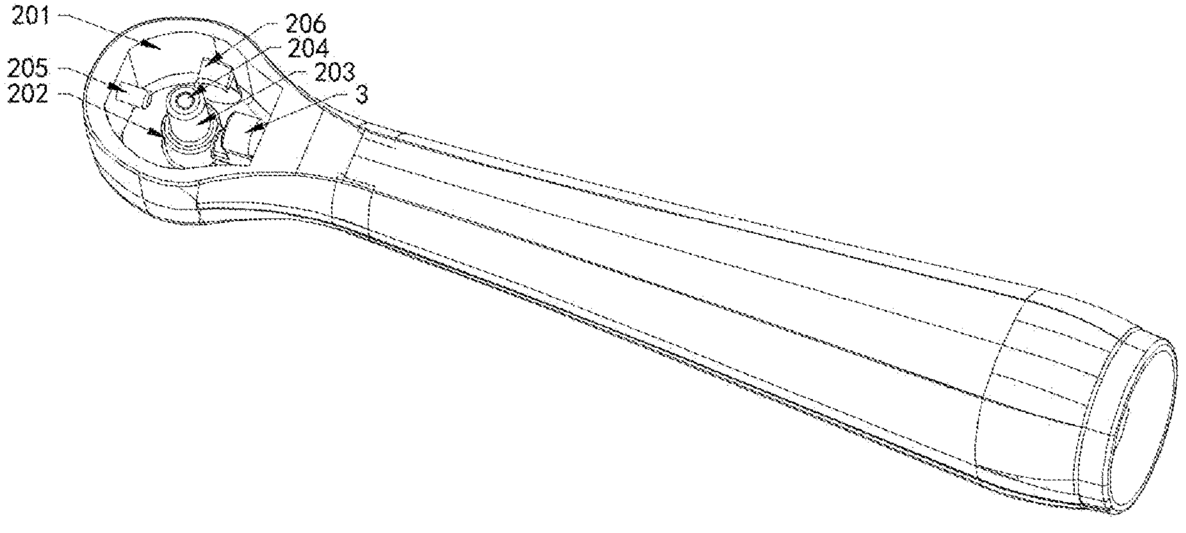
FIG. 5 shows a 3D schematic diagram of one side of a large body of the present invention.
Figure 6:
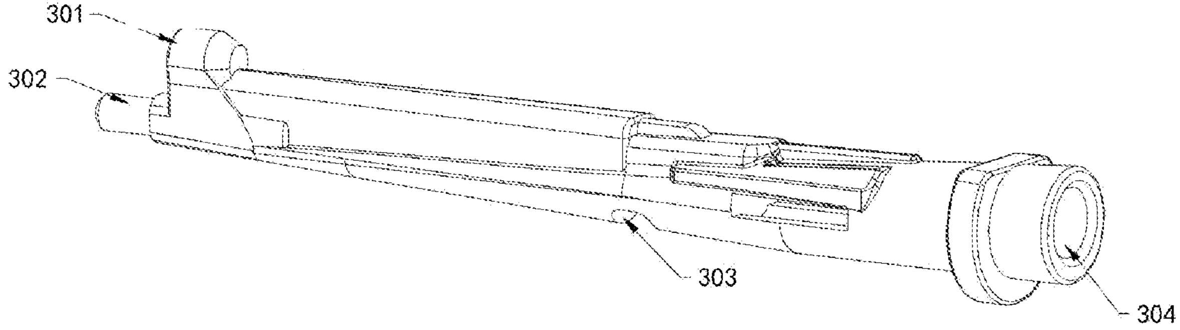
FIG. 6 shows a 3D schematic diagram of an eccentric inner shaft of the present invention.

Referring to FIGS. 2 and 5, the mounting groove 201 is provided with a second limiting post 205 at the side wall. The side wall of the toothbrush round head 1 is provided with a groove 106 that cooperates with the second limiting post 205. Because the buckle structure 206 bends, the vibration in the up-down direction and noise are generated when the toothbrush round head 1 is rotated back and forth, which affects a user's experience. The second limiting post 205 and the groove 106 are provided, which can further limit the toothbrush round head 1 in the up-down direction to reduce the vibration and noise in the up-down direction. The groove 106 runs through in the front and back direction so that the second limiting post 205 does not interfere with the toothbrush round head 1 when the toothbrush round head 1 is rotating back and forth.

Figure 7:
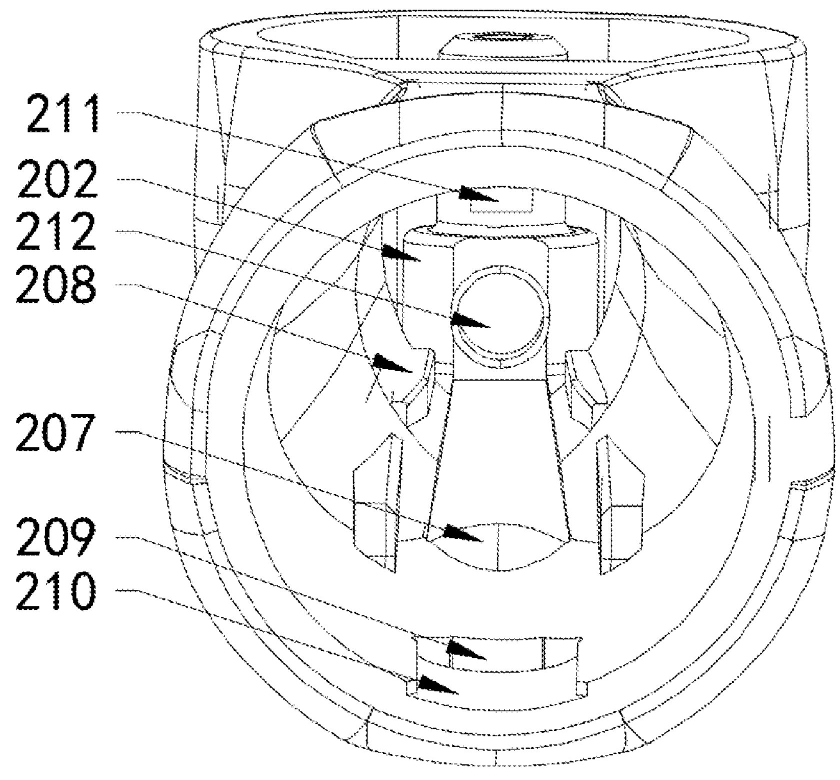
FIG. 7 shows a 3D schematic diagram of the other side of a large body of the present invention.

Referring to FIG. 2 and FIG. 7, the big body 2 is provided with the tail cover 4 at one end. The tail cover 4 is provided with a splicing structure. The splicing structure is configured to be spliced with the grip of the electric toothbrush. The grip and the toothbrush head can be spliced together through the tail cover 4. It is to be noted that the splicing structure is not limited herein. The splicing structure may be provided according to actual needs. For example, the splicing structure may be inner threads provided on the side wall of the tail cover 4. The grip is provided with external threads. The grip is connected to the tail cover 4 by the cooperation between the inner threads and the external threads. Alternatively, the splicing structure is a buckle provided on the side wall of the tail cover 4. The grip is provided with a buckle hole which cooperates with the buckle. The tail cover 4 and the grip are connected by the buckle and the buckle hole.

The tail cover 4 is provided with a bendable bending sheet 401 on the side wall. The bending sheet 401 is provided thereon with a catching block 402. The side wall of the large body 2 is opened and provided with a catching hole 209 which is clamped and combined with a catching block 402. The tail cover 4 is detachably provided with the large body 2. The tail cover 4 is mounted in the inner side of the right end of the large body 2. When the tail cover 4 is mounted, the tail cover 4 is pushed into the large body 2 from the right end. During this process of pushing in, because the bending sheet 401 is bendable, the catching block 402 is pressed up by the inner wall of the large body 2 until the catching block 402 moves to the catching hole 209. At this time, the tail cover 4 and the large body 2 are clamped, combined and fixed with the catching hole 209 through the catching block 402. When it is necessary to dismantle the tail cover 4, the catching block 402 is pressed down, and the tail cover 4 is pulled out, which is easy for disassembly and installation, and facilitates the internal cleaning of the large body 2 after disassembly.

Figure 8:
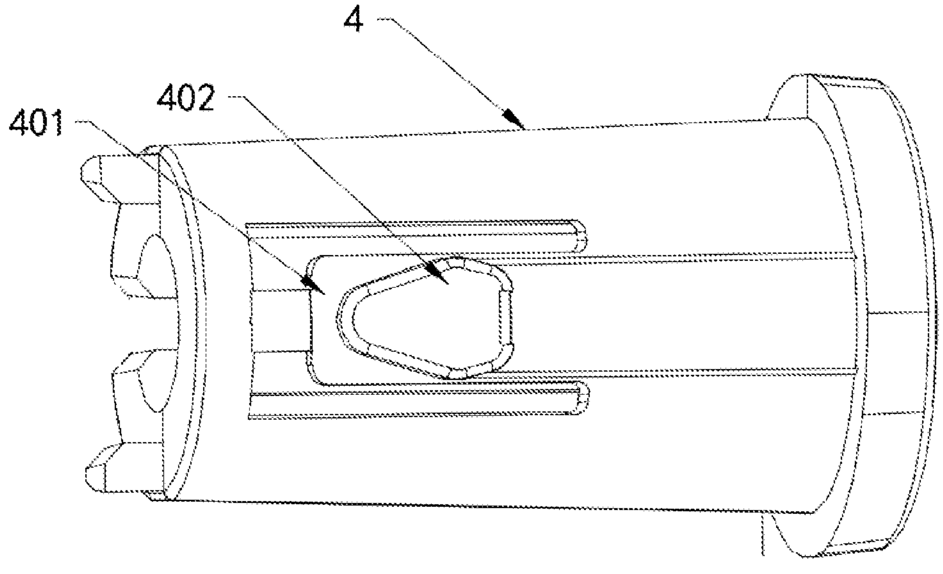
FIG. 8 shows a 3D schematic diagram of a tail cover of the present invention.

Further, referring to FIG. 2, FIG. 7 and FIG. 8, the side wall of the large body 2 is provided with a slide groove 210 in which the catching block 402 is slid. The slide groove 210 is configured to guide the catching block 402 to the catching hole 209. In the process of pushing the tail cover 4 to the catching hole 209, the tail cover 4 may be rotated, which leads to the problem that the catching block 402 may not be clamped and combined with the catching hole 209. Herein, the slide groove 210 is provided to be able to limit the catching block 402, which may effectively avoid the problem of the rotation of the tail cover 4. Therefore, the installation process is simpler.

The width of the catching block 402 decreases gradually from the end away from the toothbrush round head 1 to the end close to the toothbrush round head 1, i.e. the catching block 402 is more pointed at the end close to the toothbrush round head 1, so that it makes it easier for the catching block 402 to enter into the slide groove 210 when the tail cover 4 is mounted, thereby further simplifying the mounting process.

The side wall of the tail cover 4 is opened and provided with a strip groove 403. The strip groove 403 runs through towards one end of the tail cover 4. The side wall of the large body 2 is provided with a strip block 211 which cooperates with the strip groove 403. The strip groove cooperates with the strip block so that the connection between the tail cover 4 and the large body 2 is more stable.

The forgoing is only a preferable embodiment of the present invention, and is not intended to limit the patent scope of the present invention. Under the inventive concept of the present invention, an equivalent structure variation made by the contents of the description and drawings of the present invention directly or indirectly applied to other related arts is included in the scope of patent protection of the present invention.

What is claimed is:

1. A toothbrush head, comprising:

a toothbrush round head, which is provided with bristles on one side and a first connecting structure on an other side, the toothbrush round head being provided with a first transmission groove on a side wall;

a large body, which is provided with a mounting groove, the mounting groove being provided with a mounting base for mounting the toothbrush round head, the mounting base being provided with a second connecting structure that cooperates with the first connecting structure, and the mounting base being rotatably connected to the toothbrush round head; and an eccentric inner shaft, which is provided within the large body, the eccentric inner shaft being movably connected to the large body, the eccentric inner shaft being provided with a transmission structure that cooperates with the first transmission groove;

one of the first connecting structure and the second connecting structure is a rotating shaft, and the other is a sleeve head, the sleeve head is provided with a rotating hole corresponding to a shape of the rotating shaft, the rotating shaft is provided therein with a magnetic attraction iron post, the sleeve head is provided therein with two magnetic attraction members attracting to each other, and the two magnetic attraction members are located on opposite sides of the magnetic attraction iron post.

2. The toothbrush head according to claim 1, wherein the first connecting structure is the sleeve head, and the second connecting structure is the rotating shaft.

3. The toothbrush head according to claim 1, wherein the eccentric inner shaft is provided with a first limiting post at one side;

a side wall of the mounting base is provided with a limiting hole that cooperates with the first limiting post.

4. The toothbrush head according to claim 3, wherein the mounting groove is provided with a second limiting post at a side wall;

the side wall of the toothbrush round head is provided with a groove that cooperates with the second limiting post.

5. The toothbrush head according to claim 1, wherein the mounting groove is provided with a buckle structure at a side wall;

a side wall of the toothbrush round head is provided with a first rotating groove that is fastened with the buckle structure.

6. The toothbrush head according to claim 5, wherein the buckle structure is provided in a beveled position on a side facing an opening of the mounting groove.

7. The toothbrush head according to claim 5, wherein the eccentric inner shaft is provided with a second rotating groove at one side;

a side wall of the large body is provided with a limiting block that cooperates with the second rotating groove.

8. The toothbrush head according to claim 1, wherein the large body is provided with a plurality of limiting strips at a side wall, and the limiting strips are configured to limit the eccentric inner shaft.

9. The toothbrush head according to claim 1, wherein the large body is provided with a tail cover at one end, the tail cover is provided with a bendable bending sheet at a side wall, and the bending sheet is provided thereon with a catching block;

a side wall of the large body is provided with a catching hole that is clamped and combined with the catching block.

10. The toothbrush head according to claim 9, wherein the side wall of the large body is provided with a slide groove in which the catching block is slid, and the slide groove is configured to guide the catching block to the catching hole.

11. The toothbrush head according to claim 10, wherein a width of the catching block decreases progressively from an end away from the toothbrush round head to an end close to the toothbrush round head.

12. The toothbrush head according to claim 9, wherein a side wall of the tail cover is opened and provided with a strip groove, and the strip groove runs through the tail cover towards one end of the tail cover;

the side wall of the large body is provided with a strip block that cooperates with the strip groove.

13. The toothbrush head according to claim 9, wherein the tail cover is provided with a splicing structure, and the splicing structure is configured to be spliced with a grip of an electric toothbrush.

14. The toothbrush head according to claim 1, wherein one end of the eccentric inner shaft is provided with a second transmission groove, and the second transmission groove is configured to be connected to a drive mechanism of an electric toothbrush.

* * * * *